United States Patent
Brunn

[15] 3,680,042
[45] July 25, 1972

[54] METHODS AND APPARATUS FOR RECORDING WELL LOGGING DATA

[72] Inventor: Theodore F. Brunn, Houston, Tex.
[73] Assignee: Schlumberger Technology Corporation, New York, N.Y.
[22] Filed: May 26, 1969
[21] Appl. No.: 829,159

[52] U.S. Cl. ................................................340/18, 181/.5
[51] Int. Cl. ........................................................G01v 1/24
[58] Field of Search......................181/.5; 324/1; 340/18

[56] References Cited

UNITED STATES PATENTS

| | | | |
|---|---|---|---|
| 3,212,601 | 10/1965 | Summers | 181/.5 |
| 3,369,626 | 2/1968 | Zemanek, Jr. | 181/.5 |
| 3,393,404 | 7/1968 | Anderson et al. | 340/18 |
| 3,465,239 | 9/1969 | Wilson et al. | 324/1 |
| 3,502,169 | 3/1970 | Chapman | 181/.5 |

Primary Examiner—Rodney D. Bennett, Jr.
Assistant Examiner—N. Moskowitz
Attorney—Ernest R. Archambeau, Jr., John P. Sinnott, Stewart F. Moore, David L. Moseley, Edward M. Roney and William R. Sherman

[57] ABSTRACT

In accordance with an illustrative embodiment of the present invention, a recording and displaying apparatus is adapted to record or display well logging signals derived from a well tool in a borehole. The apparatus can record signals derived from a well logging tool of the type which rotates an acoustic transducer while emitting and receiving energy therefrom to thereby scan a borehole wall. Information signals representative of the energy received by the rotating transducer and synchronizing signals representative of the orientation of the transducer are transmitted from the well tool to the surface of the earth. At the surface of the earth, the recording apparatus uses the synchronizing signals to control the sweep of an oscilloscope generated electron beam across an indicating means while modulating the beam intensity with the information signals. A sweep rate control circuit synchronizes the sweep rate with the frequency of the synchronizing signals. The apparatus can also record or display signals derived from a well tool of the type which repetitively emits acoustic energy from a transmitter and receives the energy with one or more nearby acoustic receivers to produce information signals representative of the received energy and synchronizing signals representative of the time of energy emission. The synchronizing signals cause the electron beam to sweep across the indicating means and the information signals are used to modulate either the intensity or vertical deflection of the beam.

23 Claims, 17 Drawing Figures

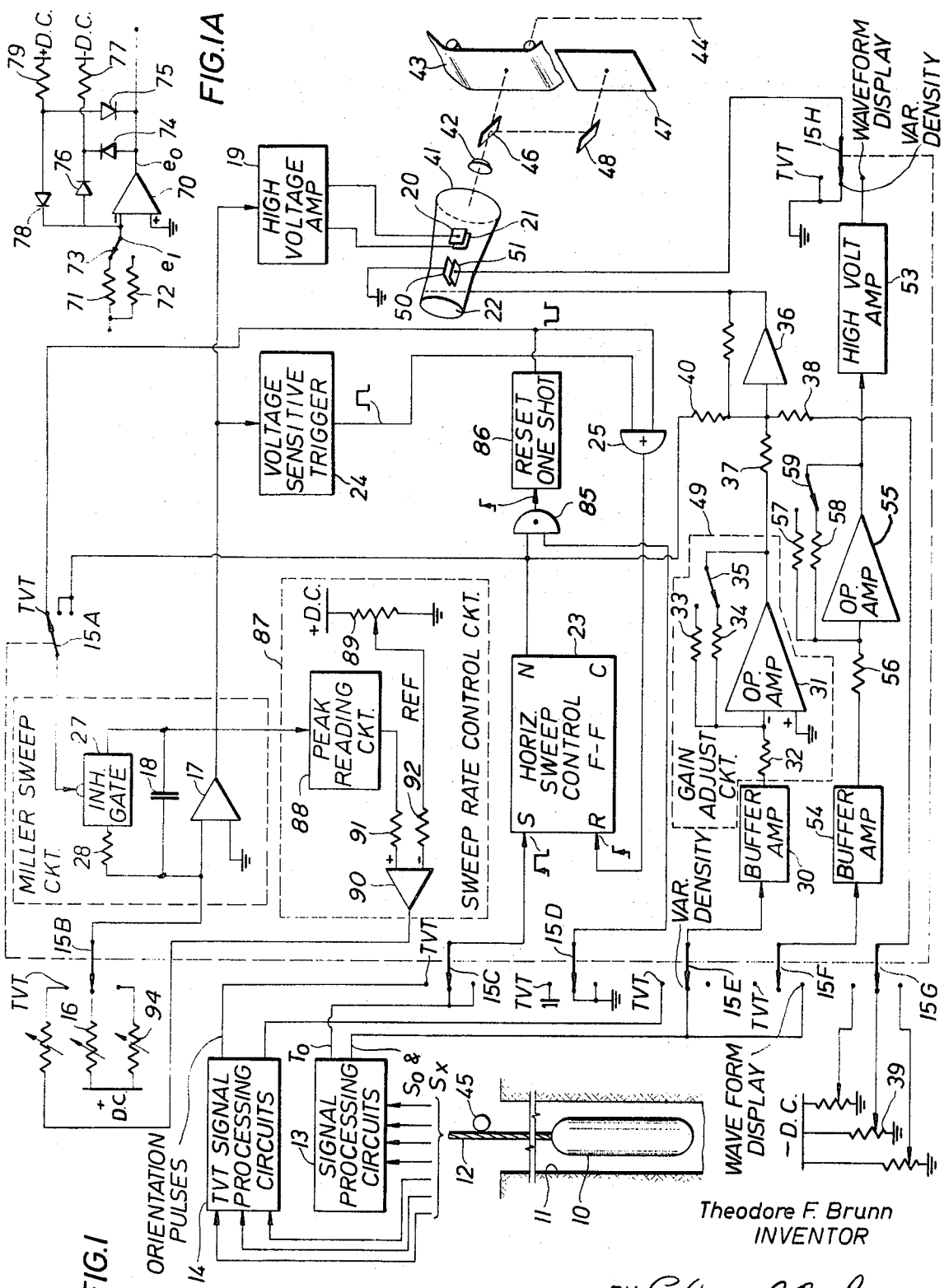

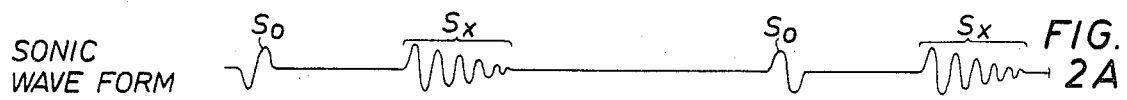
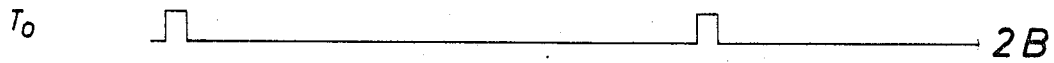
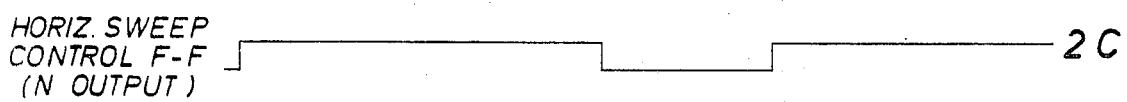
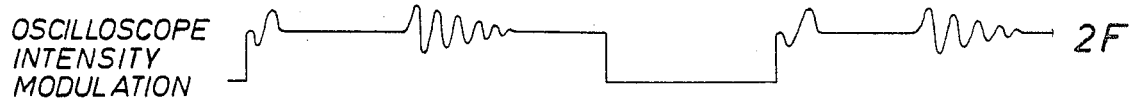
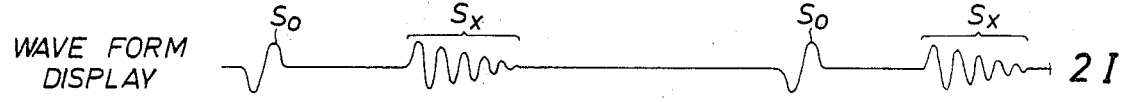
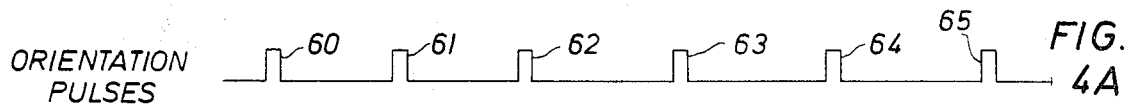
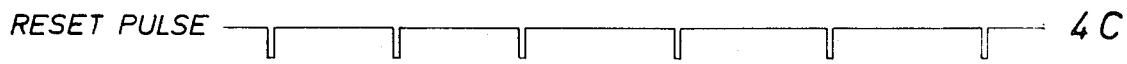
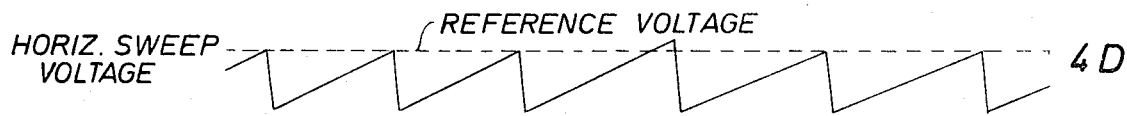
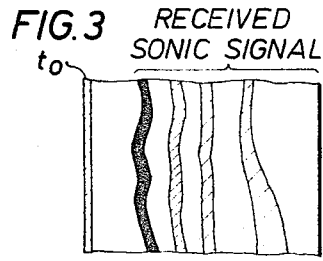
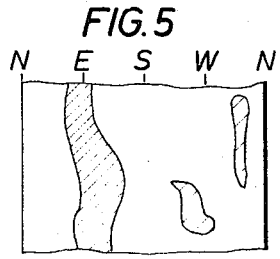

METHODS AND APPARATUS FOR RECORDING WELL LOGGING DATA

This invention relates to methods and apparatus for recording or displaying well logging data, and more particularly to methods and apparatus for recording or displaying that type of well logging data derived from a downhole well tool which produces synchronizing signals representative of a given event in the well tool and information signals representative of a measured subsurface parameter for transmission from the well tool to the surface of the earth.

In many types of well logging devices, a burst of energy is emitted from a cable supported well tool in a borehole into the adjacent formations. One or more nearby energy receiving elements are responsive to this emitted energy for producing one or more electrical signals representative of the energy received thereby. In many cases the received energy alone constitutes all of the information that it is desired to know. On the other hand, it is many times desirable to measure the time interval between the emission of energy and its detection by one or more of the nearby receiving elements. Either the entire received signal can be transmitted to the surface of the earth from the tool, or alternatively, electronic equipment in the tool can extract certain information from the received signal and transmit indications thereof to the surface of the earth.

In one type of well logging tools, acoustic energy is emitted from an acoustic transmitter and one or more nearby acoustic receivers develop electrical signals in response to the acoustic energy received thereby. A signal, usually designated $T_o$, representative of the time of emission of this acoustic energy is transmitted to the surface of the earth along with the signal or signals produced by the acoustic receiver or receivers. Suitable electronics at the surface of the earth responds to these signals for producing information representative of various characteristics of the sub-surface formations. For example, in the so-called "travel time" well logging equipment, the time interval for the acoustic energy to travel through a given vertical increment of formation is obtained. This can be accomplished either by measuring the total travel time of the acoustic energy between the transmitter and receiver, or alternatively if two or more receivers are utilized, the time for the acoustic energy to travel between two of the receivers. In practice, the travel time between two receivers is usually obtained by measuring the total travel time between the transmitter and the far receiver on one hand and the near receiver on the other hand and subtracting the near receiver travel time measurement from the far receiver travel time measurement.

It is also the practice to measure the amplitude of a selected portion of the received acoustic energy to provide information regarding the character of the formations, or if the well is cased and cemented, the quality of the cement bond and/or the quality of the cement itself.

It has also been found that the complete waveform of the acoustic signal detected by an acoustic receiver provides valuable information concerning the character of the formations in addition to that obtained by the conventional logs discussed above. By having a complete representation of the received signal amplitude through a given segment of earth formations, it is possible to derive important data relative to permeability of the formations, rock consolidation, fracture location, and other lithological characteristics that are of value in locating hydrocarbons in the formations. A sequence of such complete waveform representations, correlated with depth in the well, also provides valuable information with respect to cement bond evaluation. This can be accomplished either by displaying the received signal wave form or by producing a variable density presentation of the waveform, i.e., by modulating either the vertical deflection plate voltage or intensity of an oscilloscope. An example of apparatus for displaying the complete acoustic signal waveform is shown in U.S. Pat. No. 3,333,237 granted to Joseph E. Chapman on July 25, 1967. Apparatus for producing a variable density display is shown in U.S. Pat. No. 3,488,660.

In another type of well logging system different from those discussed above, the borehole is scanned through 360° by a rotating transducer means which repetitively emits a burst of high frequency acoustic energy. The transducer means is then responsive to the energy reflected back from the borehole wall to provide a signal representative of the intensity of the reflected energy. While investigating through successive 360° scans, the tool will slowly move through the borehole producing a helical scan pattern relative to the borehole wall. For each burst of transmitted energy, the intensity of the reflected energy is measured to produce a pulse signal representative of the presence of anomalies such as holes, cracks, etc. in the formation, or the casing of a cased borehole. The well tool also generates an orientation signal informative of the orientation of the rotating transducer means. At the surface of the earth, this orientation signal is utilized to initiate the sweep of an electron beam of an oscilloscope across the face thereof and the electrical pulses representative of the received energy are utilized to modulate the intensity of this beam as the beam is swept across the face of the oscilloscope. By moving a recording medium past the face of the oscilloscope while the electron beam is being repetitively swept across the face thereof, a picture of the borehole wall can be developed. Thus, this type of well tool is generally known as a "televiewer tool." Examples of such a well logging system are shown in U.S. Pat. No. 3,502,169 and copending application, Ser. No. 827,799 by Joseph E. Chapman filed on May 26, 1969.

To produce the visual presentation of the above Chapman patent, the electron beam is swept across the face of the oscilloscope at a constant rate. This necessitates a very high quality motor in the downhole well tool to rotate the transducer means so that the rate of rotation of the transducer means will be substantially equal to the sweep rate of the oscilloscope. It can be appreciated that if the transducer rate of rotation is different from the sweep rate, the width of the picture displayed by the oscilloscope will not always be as desired. Furthermore, if the transducer rate of rotation is erratic, one edge of this picture presentation will be uneven or ragged.

It is therefore one object of the present invention to provide new and improved methods and apparatus for synchronizing the sweep rate of a recording or display means with the rate of rotation of a downhole transducer means.

In the past, different recording apparatus has been used for recording each of the different types of signals mentioned above. Thus, one recording apparatus has been utilized for recording information derived from the televiewer tool, a separate recording apparatus has been utilized for producing a waveform display of the received acoustic energy signal, and still another recording apparatus has been utilized for producing a variable density display of data derived from a conventional acoustic or sonic logging tool.

It is therefore another object of the present invention to provide one multipurpose recording apparatus for performing all of the above-described recording and display function.

In accordance with one form of the present invention, methods and apparatus for providing indications of well logging information derived from a well logging system of the type which produces a synchronizing signal representative of a given event and an information signal representative of a selected downhole characteristic comprises producing a sweep voltage with a sweep voltage producing means. The sweep voltage is initiated in response to each synchronizing signal and is used to sweep a radiant energy beam across an indicating means. Either the intensity or vertical deflection of the beam can be modulated with at least the information signal while the beam is being swept across the indicating means to thereby produce either a variable density or waveform display on the indicating means. The sweep voltage can be monitored to reset the sweep voltage producing means whenever the beam reaches a predetermined position on the indicating means.

In accordance with another feature of the present invention, methods and apparatus for synchronizing the beam sweep with the frequency of the synchronizing signals comprises measuring a characteristic of the sweep voltage for controlling the rate of change of the sweep voltage so as to synchronize the sweep of the beam with the frequency of the synchronizing signals. This can be accomplished by measuring the peak amplitude of the sweep voltage per cycle and adjusting the rate of change of the sweep voltage until this peak amplitude is relatively constant at a desired amplitude level.

In accordance with still another feature of the present invention, all of the above recording and displaying operations can be performed with one multipurpose apparatus.

For a better understanding of the present invention, together with other and further objects thereof, reference is had to the following description taken in connection with the accompanying drawings, the scope of the invention being pointed out in the appended claims.

Referring to the drawings:

FIG. 1 is a block diagram of apparatus for recording and displaying well logging data in accordance with the present invention;

FIG. 1A shows a modification to a portion of the FIG. 1 apparatus in accordance with another form of the present invention;

FIGS. 2A–2I are waveform representations of various signals in the FIG. 1 apparatus for purposes of explaining how such apparatus produces both a waveform display and a variable density display;

FIG. 3 shows an example of a variable density log produced by the FIG. 1 apparatus;

FIGS. 4A–4D show waveform representations of various signals in the FIG. 1 apparatus for purposes of explaining the operation of such apparatus when recording signals from the televiewer tool; and FIG. 5 is a representation of a typical log produced by the FIG. 1 apparatus when recording signals from the televiewer tool.

Referring to FIG. 1, there is shown a well logging tool 10 supported in a borehole 11 on the end of a cable 12. The well tool 10 could take the form of any of the above-described well logging tools, or any other well logging tool. First concerning the operation of the FIG. 1 apparatus when processing and recording or displaying signals from a so-called conventional acoustic logging tool for making a waveform display or a variable density log, the signals produced by the tool 10 take the form of a receiver information signal $S_x$ preceded by a synchronizing signal $S_o$, as shown in FIG. 2A. The synchronizing signal $S_o$ is generated by the well tool in synchronism with the emission of acoustic energy from the well tool and the $S_x$ signal is the signal produced by the acoustic receiving transducer in response to the emitted acoustic energy striking this receiver transducer. These $S_o$ and $S_x$ signals are supplied to signal processing circuits 13 which operate in a well known manner to separate the synchronizing signal $S_o$ from the receiver signal and to produce pulses $T_o$ and $T_x$, shown in FIGS. 2B and 2H, representative of the time of arrival of the synchronizing signal and a selected amplitude portion of the receiver signal $S_x$. Usually, this $T_x$ signal is generated in response to the first amplitude excursion of the receiver signal.

The recording and display apparatus of the present invention is adapted to produce a waveform display, a variable density log, or a picture of the borehole wall as derived from signals supplied from the televiewer tool. To this end, a plurality of ganged 3-terminal switches 15A–15H are provided for selecting one of these modes of operation. In the uppermost switch position, the apparatus responds to the televiewer tool signal to produce a picture of the borehole wall; in the intermediate switch position, the apparatus produces a variable density log in response to the acoustic signals from the usual nonrotating transducer type of tool; and in the lowermost switch position, the apparatus produces a waveform display.

First concerning the variable density switch position (intermediate position), current is supplied from a positive DC voltage source via a variable resistor 16 and the switch 15B to the input of an operational amplifier 17. An integrating capacitor 18 and an inhibit gate 27 and series resistor 28 are connected in parallel across the input-output terminals of the operational amplifier 17. When the inhibit gate is unenergized, a ramp voltage will therefore be produced on the output side of the operational amplifier 17 in response to the current through resistor 16 in the well known manner. This ramp voltage, shown in FIG. 2E, is then applied to a high voltage amplifier 19 which boosts the voltage level of the ramp voltage to a value suitable for driving the horizontal deflection plates 20 and 21 of a cathode ray tube oscilloscope 22.

To control the electron beam sweep, each $T_o$ pulse derived from the signal processing circuits 13 is applied via the switch 15C to the set input of a horizontal sweep control flip-flop 23 which is set on the rising or leading edge of each $T_o$ pulse. To reset the horizontal sweep control flip-flop 23, a voltage sensitive trigger 24 monitors the ramp voltage output of the operational amplifier 17 and changes from the "0" state to the "1" state upon this ramp voltage attaining a predetermined threshold value (See FIG. 2E). The positive going or leading edge of this output signal from the voltage sensitive trigger 24 resets the horizontal sweep control flip-flop 23 by way of an OR gate 25. As seen in FIG. 2C, the normal output of the flip-flop 23 will be at the "1" level for the time interval between the $T_o$ pulse and the reset pulse generated by the voltage sensitive trigger 23. This output signal of FIG. 2C is then applied via the switch 15A to the control terminal of the inhibit gate 27 which unshorts the capacitor 18 so as to allow the ramp voltage to be produced. When the normal output of the horizontal sweep control flip-flop 23 is at its "0" level, the capacitor 18 cannot charge up because of the low resistance of resistor 28 across this capacitor.

The receiver or information signal $S_x$ from the signal processing circuits 13 is applied via the switch 15E to a buffer amplifier 30 which operates to isolate the signal processing circuits 13 from the remainder of the recording equipment. The output signal from the buffer amplifier 30 is applied to a gain adjust circuit 49 which selects the signal gain. Inside the gain adjust circuit 49, the $S_x$ signal is applied to the input of an operational amplifier 31 via an input resistor 32. The gain of the operational amplifier 31 can be selected as desired, by switching one of a pair of resistors 33 or 34 having different resistance values into the feedback path of the operational amplifier 31 with a switch 35. This gain selection operation enables signals from a multitude of various well logging tools to be processed by the FIG. 1 apparatus.

The output signal from the operational amplifier 31 is applied to another operational amplifier 36 by way of an input summing resistor 37. Current is also applied to the input of operational amplifier 36 by way of the summing resistor 38 and a switch 15G from a potentiometer 39 which is supplied with a negative DC voltage source. The normal output of the horizontal sweep control flip-flop 23 is also applied via a summing resistor 40 to the input of the operational amplifier 36. The output signal from the amplifier 36 is then applied to the grid or intensity control of the oscilloscope 22.

The current through resistor 38 from the potentiometer 39 operates to bias the intensity level of the oscilloscope 22 below a selected threshold level so as to keep an image from being produced on the face 41 of the oscilloscope. However, whenever the normal output of the horizontal sweep control flip-flop 23 goes to the "1" level during the time that the electron beam is being swept across the face 41 of the oscilloscope 22, the current through resistor 40 biases the grid of the oscilloscope 22 to a point such that an image will be produced on the face 41 thereof. The $S_o$ signal through resistor 37 then modulates the beam intensity with respect to this bias level as the electron beam is being swept across the oscilloscope face 22. To prevent vertical modulation of the electron beam during this "variable density" mode of operation, the oscilloscope vertical deflection plates 50 and 51 are both connected to ground potential with the plate 51 being so connected via the "variable density" contact of switch 15H.

The image produced on the face 41 of the oscilloscope 22 acts as an object for a lens 42 which causes an image to be produced on a record medium 43. This record medium 43 is driven as a function of borehole depth by a shaft 44 which is driven by a rotating wheel 45 coupled to the cable 12. The light produced on the face of the oscilloscope 41 passes through a dichroic mirror 46 to the record medium 43 and a portion of this light is also passed to a viewing screen 47 by way of a reflecting mirror 48 so that a visual display of the image on the face 41 of the oscilloscope 22 can be viewed by an operator.

To enable a better understanding of how the FIG. 1 apparatus produces a variable density log, refer to FIGS. 1 and 2A–2H in conjunction. The sonic signal received from the tool 10 by the signal processing circuits 13 is represented in FIG. 2A and the $T_o$ pulse produced by the signal processing circuits 13 is shown in FIG. 2B. As best seen by comparing FIGS. 2B and 2C, where FIG. 2C represents the normal output of the horizontal sweep control flip-flop 23, the leading edge of each $T_o$ pulse sets the horizontal sweep control flip-flop 23. As best seen by comparing FIGS. 2C and 2E, when the horizontal sweep control flip-flop 23 is set to thereby energize the inhibit gate 27, the horizontal sweep voltage of FIG. 2E is produced on the output of the operational amplifier 17 to thereby cause the electron beam to be swept horizontally across the face 41 of the oscilloscope 22. When the horizontal sweep voltage of FIG. 2E reaches the threshold level, as represented by the dash line of FIG. 2E, the output of the voltage sensitive trigger 24, shown in FIG. 2C, goes to the "1" level thereby resetting the horizontal sweep control flip-flop 23, as shown in FIGS. 2C and 2D. When the horizontal sweep control flip-flop 23 is reset, the inhibit gate 27 is de-energized and the capacitor 18 discharges rapidly through the low value resistor 28, as best seen in FIG. 2E. The trigger 24 insures that the electron beam will terminate its sweep at the same point each cycle.

Prior to the time that the horizontal sweep control flip-flop 23 is set, the output voltage from the operational amplifier 36 is sufficiently low to prevent an image being produced on the face 41 of the oscilloscope 22. As best seen in FIG. 2F, which shows the oscilloscope intensity modulation (the output signal from the operational amplifier 36), the intensity of the oscilloscope 22 is boosted to a sufficiently high bias level by the horizontal sweep control signal of FIG. 2C to increase the brightness of the image on the face 41 of the oscilloscope 22 to a point such as to enable this image to be recorded by the recording medium 43 and seen by the viewing screen 47. Then, the oscilloscope intensity signal is biased to a recordable and viewable level by the horizontal sweep control signal of FIG. 2C and is then modulated by the sonic waveform of FIG. 2A. The reason for controlling the intensity in this manner is to enable a recordable and viewable image to be placed on the oscilloscope face 41 only while the beam is being swept horizontally across the face thereof. By so doing, the fly-back or retrace will not be recorded or seen and furthermore, during the dead time intervals when the sonic signals are absent, there will be no recordable or viewable image.

Now referring to FIG. 2G, there is shown the variable density display produced by the recording apparatus of the present invention as it would appear on either the recording medium 43 or viewing screen 47. As is usually the case in variable density recording, the positive amplitude excursions of the sonic waveform appear as dark images on the recording medium 43 or viewing screen 47 with the intervals between the positive waveforms producing a grayish cast to the picture. The brightness and contrast can be set by adjusting the setting of the potentiometer 39 as desired.

In accordance with another feature of the present invention, a quasi-variable density display can be recorded with the apparatus of the present invention. To produce quasi-variable density recording, only selected recording densities are are produced on the record medium. Thus, for example, all low level signals can be recorded as white or clear areas on the record medium; all high level signals can be recorded as dark areas; and all signal levels therebetween can be recorded as gray areas.

To accomplish this, the circuit of FIG. 1A is substituted for the gain adjust circuit 49 of FIG. 1. In FIG. 1A, the signal output from buffer amplifier 30 is applied to the inverting input of an operational amplifier 70 by way of a selected gain adjust resistor 71 or 72 as selected by a switch 73. The noninverting input of amplifier 70 is grounded. The output of amplifier 70, along with being connected to the amplifier 36 by way of summing resistor 37 (See FIG. 1), is connected to the anode of a diode 74 and the cathode of a diode 75. The cathode of diode 74 is then connected to the cathode of a diode 76 and via a high value resistor 77 to a negative DC voltage source. The anode of diode 75 is connected to the anode of a diode 78 and via a high value resistor 79 to a positive DC voltage source. The anode of diode 76 and cathode of diode 78 are both connected to the inverting input terminal of an amplifier.

In operation, the output voltage $e_0$ from amplifier 70 will remain at or near zero volts when the input voltage $e_1$ is within a given range of zero volts. When $e_1$ exceeds a given positive voltage $+e_2$, $e_0$ will switch to a voltage level near the positive DC supply voltage and when $e_1$ exceeds a given negative voltage $-e_2$, $e_0$ will switch to a voltage level near the negative DC supply voltage.

Thus, if $e_1$ is greater than $-e_2$ and less than $+e_2$, an equal amount of current will pass through resistor 79 and diode 78 as passes through diode 76 and resistor 77 thus insuring that the anode of diode 78 and cathode of diode 76 will be at substantially the same voltage (minus the voltage drop across diodes 76 and 78). If the positive and negative DC supply voltages have the same absolute magnitude and the value of resistors 77 and 79 are the same, $e_0$ will remain clamped to zero volts in this situation.

When $e_1$ exceeds $+e_2$, diode 78 will turn off thus removing the negative clamp on $e_0$. Thus, $e_0$ will switch to a negative voltage near the negative DC voltage supply. On the other hand, when $e_1$ is less than $-e_2$, diode 76 will turn off and $e_0$ will switch to a voltage level near the negative DC supply voltage.

Now concerning how the FIG. 1 apparatus produces a waveform display, the ganged switches 15A–15H are placed in the waveform display position to perform this function. In this waveform display mode of operation, the horizontal sweep voltage is produced in response to the $T_o$ signals from the signal processing circuits 13 in exactly the same manner as discussed above in connection with the "variable density" mode of operation. However, instead of the sonic signal of FIG. 2A being supplied to the buffer amplifier 30 for subsequent application to the intensity control of the oscilloscope 22, it is instead applied via another channel to the vertical deflection plates 50 and 51.

In this "waveform display" mode of operation, the sonic signals $S_o$ and $S_x$ from the signal processing circuits 13 are applied via the "waveform display" position of switch 15F, buffer amplifier 54 and operational amplifier 55 to the input of the high voltage amplifier 53. The buffer amplifier 54 and operational amplifier 55 with associated resistors 56, 57 and 58 and double-throw switch 59 perform the same functions as the earlier discussed buffer amplifier 30 and operational amplifier 31 with associated resistors 33 and 34 and switch 35. The output signal from the high voltage amplifier 53 is then applied to the oscilloscope vertical deflection plates 50 and 51 via the "waveform display" position of switch 15H so as to deflect the sweeping electron beam in a vertical direction in accordance with the fluctuations of the sonic waveform. Thus, the waveform display shown in FIG. 2I will be produced on either the recording medium 43 or the viewing screen 47.

Now concerning how the apparatus of the present invention produces a picture of the borehole wall in response to the signals produced by the televiewer tool, refer to FIGS. 1 and 4A–4D in conjunction. When recording these televiewer signals, the ganged switches 15A–15H are moved to the uppermost position. In this televiewer mode of operation, the pulses representative of energy received by the rotating transducer (discussed earlier) are applied via the switch 15E through the same signal channel that processed the receiver signals when the apparatus was operating in the "variable density" mode of operation.

However, in this televiewer mode of operation, the operation of the horizontal sweep circuits is completely different from the "variable density" or "waveform display" modes of operation. As discussed earlier, the sweep rate of the oscilloscope, i.e., the rate of change of the ramp voltage of FIG. 2E, has to be synchronized with the rate of rotation of the downhole transducer to provide a clean looking picture. Unfortunately, it is not always possible to maintain this transducer rate of rotation always constant in which case picture distortion will result. To solve this problem in accordance with the present invention, the sweep rate is varied in accordance with the transducer rate of rotation.

As discussed earlier, the televiewer tool produces a synchronizing or orientation signal informative of the orientation of the rotating transducer. The TVT signal processing circuits 14 are responsive to this synchronizing or orientation signal to generate an orientation pulse whenever the rotating transducer has a fixed reference orientation. When the borehole is uncased, this orientation pulse is representative of the azimuthal orientation of the rotating transducer, and when the borehole is cased, it is representative of the orientation of the rotating transducer relative to a fixed reference point on the circumference of the well tool. The apparatus of the present invention controls the oscilloscope sweep rate in accordance with the frequency of these orientation pulses. To this end, referring to FIG. 1, the orientation pulses (See FIG. 4A) are utilized to set the horizontal sweep control flip-flop 23 via the "TVT" position of the switch 15C. When in the televiewer mode of operation, an AND gate 85 is enabled by applying a positive DC voltage via the switch 15D to one input of this AND gate 85. In the "variable density" and "waveform display" modes of operation, this input terminal to the AND gate 85 is grounded thus disabling the AND 85. When the AND gate 85 is enabled, the rising edge of the normal output of the horizontal sweep control flip-flop 23 (See FIG. 4B) sets a one-shot 86, designated reset one-shot, which produces a negative going pulse (See FIG. 4C) whose rising or lagging edge resets the horizontal sweep control flip-flop 23 via the OR gate 25. The output of the reset one-shot 86 is also applied to the control terminal of the inhibit gate 27 via the "TVT" position of switch 15A.

In this televiewer mode of operation, the control terminal of the inhibit gate 27 is disconnected from the horizontal sweep control flip-flop 23 and connected to the output of the reset one-shot 86 by switch 15A. Since the reset one-shot 86 is normally at the "1" level, the inhibit gate 27 is normally energized to enable the capacitor 18 to charge-up thus producing the horizontal sweep voltage for application to the horizontal deflection plates 20 and 21 of the oscilloscope 22. However as soon as the reset one-shot 86 is energized, the output thereof goes to the "0" level thus de-energizing the inhibit gate 27 and causing the capacitor 18 to discharge. The reason for this difference in operation for the televiewer mode of operation will become apparent later.

To maintain the oscilloscope sweep rate synchronized with the transducer rate of rotation, a sweep rate control circuit 87 monitors the peak voltage of the horizontal sweep voltage and adjusts the current supplied to the sweep circuit to maintain this peak voltage equal to a reference voltage. To this end, a peak reading circuit 88 is responsive to the ramp voltage on the output of the operational amplifier 17 for producing a DC type output signal proportional to the peak level of this horizontal sweep voltage. This peak reading circuit also includes a low-pass filter output stage which operates to smooth out or average changes in the measured peak voltage so that the output signal from the peak reading circuit will be proportional to the peak value of the ramp voltage averaged over a few cycles. By this means, occasionally missed orientation or synchronizing pulses, or noise pulses mistaken as orientation pulses, will not cause great changes in the oscilloscope sweep rate. This output signal from the peak reading circuit 88 is compared with a reference voltage derived from a potentiometer 89 by a voltage comparator circuit which comprises an operational amplifier 90 and two input resistors 91 and 92. The output voltage from the operational amplifier 90, which will be proportional to the difference between the two applied input voltages, is applied via a variable resistor 94 and the switch 15B to the input of the operational amplifier 17 to thereby produce the horizontal sweep voltage.

It can be seen that this circuitry, just described, comprises a negative feedback loop which operates to maintain the peak value of the ramp voltage, on the average, equal to the reference voltage supplied from the potentiometer 89. That is to say, since the gain of amplifier 90 is reasonably high, whenever the peak voltage measured by the peak reading circuit 88 changes from the reference voltage, the operational amplifier 90 will adjust the current being applied to the operational amplifier 17 until this measured peak voltage is truly equal to the reference voltage. By so doing, the ramp voltage will, on the average, charge-up to a fixed value which is proportional to the reference voltage regardless of the frequency of the azimuth pulses.

Since the exact amplitude of the ramp voltage is representative of a given horizontal position on the oscilloscope face 41, it can be seen that the electron beam sweep will tend to start and stop at the same horizontal point on the oscilloscope face 41. Since the amount of current supplied to the operational amplifier 17 is proportional to the sweep rate, it can be seen that this feedback circuit operates to adjust the sweep rate in accordance with the rate of rotation of the downhole transducer.

Referring to FIGS. 1 and 4A–4D in conjunction to gain a better understanding of this operation, the orientation pulses applied to the horizontal sweep control flip-flop 23 are shown in FIG. 4A and the normal output of the horizontal sweep control flip-flop 23 is shown in FIG. 4B. As best seen by comparing FIGS. 4B and 4C, FIG. 4C showing the reset pulse generated by the reset one-shot 86, the horizontal sweep control flip-flop 23 will be reset at the trailing edge of the reset pulse of FIG. 4C. As seen by comparing FIGS. 4C and 4D, the reset pulses of FIG. 4C energize the inhibit gate 27 to cause the horizontal sweep voltage of FIG. 4D to be reset to its initial or starting voltage. After each reset pulse of FIG. 4C has terminated, i.e., gone back to the "1" level, the capacitor 18 proceeds to charge-up again to produce the horizontal sweep voltage of FIG. 4D. The capacitor 18 continues charging until the next orientation pulse sets the horizontal sweep control flip-flop 23 to again cause the reset one-shot 86 to reset the capacitor 18.

It can be seen that without the sweep rate control circuit 87, the capacitor 18 would continue charging to a peak value proportional to the period or time interval between orientation pulses. With the sweep rate control circuit 87, the rate of change of this horizontal sweep ramp voltage is adjusted so that the peak value, on the average, will always be the same.

Taking an example of this operation, assume that the first three orientation pulses 60, 61 and 62 of FIG. 4A are a constant time interval apart. Furthermore assume that the time separation between the next three orientation pulses 63, 64 and 65 is different than for the first three. Thus, as seen in FIG. 4D, the horizontal sweep voltage will climb to the reference voltage level represented by the dash line in FIG. 4D. This voltage corresponds to the reference voltage set by the potentiometer 89. During the time interval between the azimuth pulses 62 and 63, the ramp voltage of FIG. 4D will climb to a voltage level higher than this reference voltage. In this event, the right-hand edge of the TVT picture will be displaced from its usual position by a given amount. However, the peak reading circuit 88 of the sweep rate control circuit 87 observes this increased peak voltage and causes the output of the operational amplifier 90 to decrease somewhat thereby decreasing the amount of current supplied to the operational amplifier 17 of the sweep circuit. This then will cause the next subsequent ramp signal to attain a peak value closer to the reference voltage level and ultimately, the sweep rate of the oscilloscope will again be synchronized with the transducer rate of rotation.

It should be noted that the time constant of this sweep rate control circuit, i.e., the low-pass filter on the output of the peak reading circuit 88, should be set sufficiently high that occasional missed orientation pulses or erroneous noise pulses will not produce drastic changes in the sweep rate. On the other hand, the time constant of this circuit should be set fast enough to follow authentic fluctuations of the transducer rate of rotation. In the usual manner in such a situation, a suitable compromise between the two considerations should be arrived at.

Turning now to FIG. 5, there is shown a typical example of a picture of the borehole wall produced by the apparatus of the present invention. The azimuth designations are also shown in FIG. 5. It should be noted that the sweep rate control circuit of the present invention operates to maintain the right-hand edge (assuming the electron beam sweeps from left to right) straight regardless of the transducer rate of rotation.

It can thus be seen that with the apparatus of the present invention, one recording and displaying apparatus can be utilized for recording and displaying information from a plurality of different well logging tools. Moreover, the apparatus of the present invention enables a recording apparatus to be automatically synchronized with the rate of operation of a well logging tool on the end of a cable in a borehole. In this specific example, the sweep rate of an oscilloscope is automatically synchronized with the rate of rotation of an energy emitting and receiving transducer means in a borehole even when that rate of rotation can vary.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for providing indications of well logging information derived from a well logging system of the type which produces a synchronizing signal representative of a given event and an information signal representative of a selected downhole characteristic, comprising:
   indicating means;
   sweeping means adapted for sweeping a radiant energy beam across said indicating means;
   means adapted for producing a sweep voltage for energizing said sweeping means to sweep said radiant energy beam across said indicating means;
   means for monitoring said sweep voltage and producing an output signal upon said sweep voltage attaining a predetermined amplitude;
   means responsive to said synchronizing signal and said output signal for producing a sweep control signal for application to said sweep voltage producing means to cause a sweep voltage to be produced; and
   means for modulating a parameter of said beam with at least the information signal to thereby produce a modulated image on said indicating means.

2. Apparatus for providing indications of well logging information derived from a well logging system of the type which produces a synchronizing signal representative of a given event and an information signal representative of a selected downhole characteristic, comprising:
   indicating means;
   sweeping means adapted for sweeping a radiant energy beam across said indicating means;
   means adapted for producing a sweep voltage for energizing said sweeping means to sweep said radiant energy beam across said indicating means;
   means for monitoring said sweep voltage and producing an output signal upon said sweep voltage attaining a predetermined amplitude;
   bistable means responsive to said synchronizing signal and said output signal for producing a sweep enabling signal during the time interval between said synchronizing signal and said output signal for application to said sweep voltage producing means to cause a sweep voltage to be produced during said time interval; and
   means for modulating a parameter of said beam with at least an information signal to thereby produce a modulated image on said indicating means.

3. Apparatus for providing indications of well logging information derived from a well logging system of the type which produces a synchronizing signal representative of a given event and an information signal representative of a selected downhole characteristic, comprising:
   indicating means;
   means adapted for producing a radiant energy beam and sweeping said beam across said indicating means, said sweeping means including means for modulating the intensity of said beam and vertical and horizontal deflection means for altering the vertical and horizontal position of said beam on the indicating means;
   means responsive to said synchronizing signal for producing a ramp voltage for application to said horizontal deflection means to sweep said radiant energy beam across said indicating means; and
   selection means for applying said information signal to one of said intensity means or said vertical deflection means and causing said vertical deflection means to maintain said beam always at the same vertical position on said indicating means when said information signal is being applied to said intensity means to thereby produce either a variable density or waveform display indication on said indicating means.

4. The apparatus of claim 3 wherein said selection means includes first and second signal channels, first switch means for applying said information signal to a selected one of said first or second signal channels, said first signal channel applying said information signal to said intensity means whenever a variable density indication is desired, second switch means for selecting said information signal from said second signal channel for application to said vertical deflection means whenever a waveform indication is desired and shorting deflection plates of said vertical deflection means together whenever a variable density indication is desired.

5. Apparatus for providing indications of well logging information derived from a well logging system of the type which produces a synchronizing signal representative of a given event and an information signal representative of a selected downhole characteristic, comprising:
   indicating means;
   sweeping means responsive to said synchronizing signal for sweeping a radiant energy beam across said indicating means; and
   means for modulating the intensity of said beam with representations of said information signal, said modulating means including first, second, and third amplitude discrimination means adapted for producing signals having first, second, and third amplitude levels when the amplitude of the information signal is within first, second and third amplitude ranges for modulating said beam intensity whereby first, second and third levels of density of said indications will be produced on said indicating means.

6. Apparatus for recording well logging information derived from a well tool of the type which repetitively emits and receives energy in a media surrounding said well tool and develops synchronizing signals representative of the time of energy emission and also develops information signals representative of the energy received by said well tool for transmission to the surface of the earth, comprising:
   indicating means;

sweeping means responsive to each synchronizing signal for sweeping a radiant energy beam across said indicating means; and means for modulating the intensity of said beam with representations of said information signals, said modulating means including amplitude discrimination means adapted for producing at least one constant amplitude signal when the amplitude of the information signal is within a given range for modulating said beam intensity.

7. Apparatus for recording well logging information derived from a well tool of the type which repetitively emits and receives energy in a media surrounding said well tool and develops synchronizing signals representative of the time of energy emission and also develops information signals representative of the energy received by said well tool for transmission to the surface of the earth, comprising:

indicating meanS;

sweeping means adapted for sweeping a radiant energy beam across said indicating means;

means adapted for producing a ramp voltage for energizing said sweeping means to sweep said radiant energy beam across said indicatinG means;

means for monitoring said sweep voltage and producing an output signal upon said sweep voltage attaining a predetermined amplitude;

means responsive to said synchronizing signal and said output signal for producing a sweep control signal for application to said ramp voltage producing means to cause a ramp voltage to be produced; and means for modulating a parameter of said beam with at least the information signal to thereby produce a modulated image on said indicating means.

8. Apparatus for providing indications of well logging information derived from a well logging system of the type which repetitively produces a synchronizing signal representative of a given event and an information signal representative of a selected downhole characteristic, comprising:

indicating means;

means adapted for sweeping a radiant energy beam across said indicating means;

means responsive to each synchronizing signal for producing a sweep voltage for application to said sweeping means to cause said beam to be swept across said indicating means, the time duration of said sweep voltage being dependent on the time interval between synchronizing signals;

means responsive to a characteristic of said sweep voltage for controlling the rate of change of said sweep voltage to synchronize the sweep of said beam with the frequency of said synchronizing signals; and means for modulating a parameter of said beam with at least the information signal to thereby prOduce a modulated image on said indicating means.

9. Apparatus for providing indications of well logging information derived from a well logging system of the type which repetitively produces a synchronizing signal representative of a given event and an information signal representative of a selected downhole characteristic, comprising:

indicating means;

means adapted for sweeping a radiant energy beam across said indicating means;

means responsive to each synchronizing signal for producing a ramp voltage for application to said sweeping means to cause said beam to be swept across said indicating means, the time duration of said ramp voltage being dependent on the time interval between synchronizing signals;

means responsive to said ramp voltage for producing an output signal representative of the peak amplitude of said ramp voltage;

means responsive to said output signal for controlling the rate of change of said ramp voltage so that the peak amplitude of said sweep voltage will be relatively constant regardless of the time interval between synchronizing signals; and means for modulating a parameter of said beam with at least the information signal to thereby produce a modulated image on said indicating means.

10. Apparatus for providing indications of well logging information derived from a well logging system of the type which repetitively produces a synchronizing signal representative of a given event and an information signal representative of a selected downhole characteristic, comprising:

an indicating means;

means adapted for sweeping a radiant energy beam across said indicating means;

sweep voltage producing means responsive to a control current for producing a sweep voltage for application to said sweeping means to cause said beam to be swept across said indicating means;

reset means responsive to said synchronizing signals for repetitively resetting said sweep voltage producing means to cause said sweep voltage to repetitively return to a given reference voltage;

means responsive to said sweep voltage for producing an output signal representative of the peak amplitude of said sweep voltage;

control means responsive to said output signal for producing said control current for application to said sweep voltage producing means, said control means operating to adjust the magnitude of said control current to a value which tends to maintain the peak amplitude of said sweep voltage at a relatively constant level; and means for modulating a parameter of said beam with at least the information signal to thereby produce a modulated image on said indicating means.

11. The apparatus of claim 10 wherein said sweep voltage producing means comprises charge storage means responsive to said control current for producing a ramp voltage which changes amplitude at a rate related to the magnitude of said control current; and wherein said reset means comprises means responsive to each synchronizing signal for discharging said charge storage means to a reference charge.

12. The apparatus of claim 10 wherein said control means includes means for producing a reference voltage representative of the desired peak amplitude of said sweep voltage, comparing means for comparing said measured peak voltage output signal with said reference voltage and generating a sufficient amount of said control current to maintain a substantially constant relationship between said output signal and said reference voltage.

13. The apparatus of claim 12 wherein said measured peak amplitude output signal generating means includes peak voltage measuring means for measuring the peak voltage of the sweep voltage per cycle, and averaging means for averaging said measured peak Voltage to produce said output signal for application to said comparing means whereby said output signal will change in a relatively slow manner with changes in said measured peak sweep voltage.

14. The apparatus of claim 10 and further including override means responsive to said sweep voltage attaining a predetermined amplitude level for energizing said reset means to reset said sweep voltage producing means even in the absence of a synchronizing signal.

15. Multipurpose apparatus for providing indications of well logging information derived from well logging systems of the type which produce synchronizing and information signals, a first one of said system comprising a rotating borehole scanning device where said synchronizing signals are orientation signals representative of the orientation of said scanning device and said information signals are representative of a subsurface parameter, and wherein a second one of said systems comprises energy emitting and receiving means where said synchronizing signal is representative of the time of energy emission and said information signal is representative of the received energy, comprising:

indicating means;

sweeping means adapted for sweeping a radiant energy beam across said indicating means;

means adapted for producing a sweep voltage for energizing said sweeping means to sweep said radiant energy beam across said indicating means;

means for modulating a parameter of said beam with at least an information signal to thereby produce a modulated image on said indicating means;

means for monitoring said sweep voltage and producing an output signal upon said sweep voltage attaining a predetermined amplitude; and control means operative when processing signals from said second system and responsive to said synchronizing signal and said output signal for causing a sweep voltage to be produced during the time interval between a synchronizing signal and one of said output signals and operative when processing signals from said first system for causing a sweep voltage to be continuously produced except for a predetermined reset time interval upon receipt of a synchronizing signal.

16. The apparatus of claim 15 wherein said control means includes bistable means adapted to be set by a synchronizing signal and reset by one of said output signals, pulse generating means adapted to be responsive to said bistable means being set for producing a reset pulse, mode selection means for selecting whether signals from said first or second well logging systems are to be processed and including means for applying information signals from a selected one of said well logging systems to said modulating means, means for applying synchronizing signals from a selected one of said well logging systems to the set input of said bistable means, means operative during said second system mode of operation for applying an output signal to said sweep voltage producing means to cause a sweep voltage to be produced while said bistable means is set, means operative during said first system mode of operation for causing said sweep voltage producing means to continuously produce a sweep voltage, and means operative during said first system mode of operation for resetting said sweep voltage producing means in response to said bistable means being set.

17. Apparatus for providing indications of well logging information derived from a well tool of the type which emits and receives energy and produces a synchronizing signal representative of the time of energy emission and an information signal representative of the energy received by said well tool, comprising:

indicating means;

sweeping means adapted for sweeping a radiant energy beam across said indicating means;

means adapted for producing a sweep voltage for energizing said sweeping means to sweep said radiant energy beam across said indicating means;

means for monitoring said sweep voltage and producing an output signal upon said sweep voltage attaining a predetermined amplitude;

means responsive to said synchronizing signal and said output signal for producing a sweep control signal for application to said ramp voltage producing means to cause a ramp voltage to be produced during the time interval between said synchronizing signal and said output signal so that said sweeping beam will begin and terminate its sweep at predetermined points on said indicating means, said beginning point relating to each synchronizing signal; and means for modulating a parameter of said beam with said synchronizing and information signals to thereby produce a modulated image of said signals on said indicating means with the image relating to said synchronizing signal appearing at the beam starting point on said indicating means.

18. Apparatus for providing indications of well logging information derived from a well tool of the type which rotates energy emitting and receiving means to scan a borehole wall while emitting and receiving energy from said means and produces a synchronizing signal representative of the orientation of said energy means and information signal representative of the energy received by said energy means, comprising:

indicating means;

sweeping means adapted for sweeping a radiant energy beam across said indicating means;

means responsive to each synchronizing signal for producing a ramp voltage for application to said sweeping means for sweeping said beam across said indicating means, the time duration of said ramp voltage being dependent on the time interval between synchronizing signals;

means responsive to said ramp voltage for producing an output signal representative of the peak amplitude of said ramp voltage;

means responsive to said output signal for controlling the rate of change of said ramp voltage so that the peak amplitude of said ramp voltage will be relatively constant regardless of the time interval between synchronizing signals; and means for modulating the intensity of said beam with said information signal to thereby produce a modulated image on said indicating means.

19. A method of providing indications of well logging information derived from a well logging system of the type which repetitively produces a synchronizing signal representative of a given event and an information signal representative of a selected downhole characteristic, comprising:

producing a sweep voltage in response to each synchronizing signal, the time duration of said sweep voltage being dependent on the time interval between synchronizing signals;

sweeping a radiant energy beam across an indicating means in response to said sweep voltage;

measuring a characteristic of said sweep voltage and controlling the rate of change of said sweep voltage in response to said measured characteristic to synchronize the sweep of said beam with the frequency of said synchronizing signals; and modulating a parameter of said beam with at least the information signal to thereby produce a modulated image on said indicating means.

20. A method of providing indications of well logging information derived from a well logging system of the type which repetitively produces a synchronizing signal representative of a given event and an information signal representative of a selected downhole characteristic, comprising:

producing a ramp voltage in response to each synchronizing signal, the time duration of said ramp voltage being dependent on the time interval between synchronizing signals;

sweeping a radiant energy beam across an indicating means in response to said ramp voltage;

measuring the peak amplitude of said ramp voltage;

controlling the rate of change of said ramp voltage to maintain the measured peak amplitude of said sweep voltage relatively constant regardless of the time interval between synchronizing signals; and modulating a parameter of said beam with at least the information signal to thereby produce a modulated image on said indicating means.

21. A method of providing indications of well logging information derived from a well logging system of the type which repetitively produces a synchronizing signal representative of a given event and an information signal representative of a selected downhole characteristic, comprising:

producing a sweep voltage in response to a control current;

sweeping a radiant energy beam across an indicating means in response to said sweep voltage;

repetitively resetting said sweep voltage to a reset voltage in response to said synchronizing signals;

measuring the peak amplitude of said sweep voltage;

generating said control current to produce said sweep voltage and adjusting the magnitude of said control current to a value which tends to maintain the peak amplitude of said sweep voltage at a relatively constant level; and modulating a parameter of said beam with at least the information signal to thereby produce a modulated image on said indicating means.

22. The method of claim 21 wherein the steps of generating and adjusting said control currents includes the steps of producing a reference voltage representative of the desired peak amplitude of said sweep voltage; and comparing said measured peak voltage with said reference voltage and generating a sufficient amount of said control current to maintain a substantially constant relationship between said measured peak voltage and said reference voltage.

23. A method of providing indications of well logging information derivinG from a well logging system of the type which repetitively produces a synchronizing signal representative of a given event and an information signal representative of a selected downhole characteristic, comprising:

producing a sweep voltage to sweep a radiant energy beam across an indicating means in response to each synchronizing signal;

monitoring said sweep voltage and producing an output signal upon said sweep voltage attaining a predetermined amplitude;

using said output signal to reset said sweep voltage to a reference voltage to thereby retrace the beam across said indicating means; and modulating a parameter of said beam with at least the information signal while said beam is sweeping across said indicating means to thereby produce a modulated image on said indicating means.

* * * * *